US012329693B2

(12) United States Patent
Davis et al.

(10) Patent No.: US 12,329,693 B2
(45) Date of Patent: Jun. 17, 2025

(54) LIGHTWEIGHT CASKET LID HAVING ENHANCED BIODEGRADABILITY

(71) Applicant: Vandor Group, Inc., Richmond, IN (US)

(72) Inventors: Justin F Davis, Richmond, IN (US); Alan H Elder, Richmond, IN (US)

(73) Assignee: Vandor Group, Inc., Richmond, IN (US)

( * ) Notice: Subject to any disclaimer, the term of this patent is extended or adjusted under 35 U.S.C. 154(b) by 0 days.

(21) Appl. No.: 18/328,332

(22) Filed: Jun. 2, 2023

(65) Prior Publication Data

US 2023/0390138 A1 Dec. 7, 2023

Related U.S. Application Data

(60) Provisional application No. 63/348,334, filed on Jun. 2, 2022.

(51) Int. Cl.

| | |
|---|---|
| ***A61G 17/02*** | (2006.01) |
| ***A61G 17/007*** | (2006.01) |
| ***A61G 17/04*** | (2006.01) |

(52) U.S. Cl.

CPC ......... *A61G 17/032* (2017.05); *A61G 17/007* (2013.01); *A61G 17/041* (2016.11)

(58) Field of Classification Search

CPC .. A61G 17/032; A61G 17/041; A61G 17/007; A61G 17/0073; A61G 17/004; A61G 17/034

See application file for complete search history.

(56) References Cited

U.S. PATENT DOCUMENTS

| | | | | |
|---|---|---|---|---|
| 4,063,337 A * | 12/1977 | Havey, III | A61G 17/001 | 27/35 |
| 4,146,948 A * | 4/1979 | Royce | A61G 17/007 | 27/5 |
| 6,269,526 B1 * | 8/2001 | Bischoff | A61G 17/007 | 27/35 |
| 8,151,421 B2 * | 4/2012 | Hsu | A61G 17/0073 | 27/4 |

(Continued)

FOREIGN PATENT DOCUMENTS

| | | | |
|---|---|---|---|
| GB | 2358857 A * | 8/2001 | A61G 17/00 |
| JP | H07275304 A * | 10/1995 | |
| KR | 2241274 B1 * | 4/2021 | |

*Primary Examiner* — William L Miller

(74) *Attorney, Agent, or Firm* — Maginot, Moore & Beck LLP

(57) ABSTRACT

A casket arrangement includes a container having a bottom, first and second side walls, and first and second end walls forming an open top box having a length and width configured to receive a deceased human body in supine position. The walls and bottom are formed of biodegradable material. The arrangement further includes a rigid strip operably coupled to the first side wall and disposed between an interior of the container and the first side wall. The arrangement further includes a strap handle having a first end portion, a second end portion, and an intermediate portion. The end portions are affixed to the rigid strip. The intermediate portion extends from each end portion through at least one opening in the first side wall, such that the intermediate portion forms a flexible loop external to the container that is sized to receive a human hand for use as a handle.

20 Claims, 8 Drawing Sheets

(56) References Cited

U.S. PATENT DOCUMENTS

| | | | | |
|---|---|---|---|---|
| 9,056,040 | B2 * | 6/2015 | Gesell | B65D 5/64 |
| 2007/0084028 | A1 * | 4/2007 | Cox | A61G 17/004<br>27/4 |
| 2009/0007402 | A1 * | 1/2009 | Carroll | A61G 17/007<br>27/28 |
| 2011/0162178 | A1 * | 7/2011 | Jensen | B63C 7/16<br>27/28 |
| 2013/0174392 | A1 * | 7/2013 | Chua | A61G 17/06<br>112/475.08 |
| 2014/0026378 | A1 * | 1/2014 | Gessel | A61G 17/0073<br>27/14 |
| 2014/0123450 | A1 * | 5/2014 | Jenson | A61G 17/004<br>27/14 |
| 2014/0259577 | A1 * | 9/2014 | Richardson | A61G 17/06<br>27/28 |
| 2014/0366342 | A1 * | 12/2014 | Fenton | A61G 17/06<br>29/428 |
| 2015/0067997 | A1 * | 3/2015 | Biller | H04L 63/1441<br>27/13 |
| 2016/0101009 | A1 * | 4/2016 | Newell | A61G 17/041<br>29/455.1 |
| 2016/0367424 | A1 | 12/2016 | Krinsky | |
| 2017/0281448 | A1 * | 10/2017 | Davis | A61G 17/047 |
| 2020/0206057 | A1 * | 7/2020 | Wainman | A61G 17/042 |
| 2024/0091090 | A1 * | 3/2024 | Begay | A61G 17/007 |
| 2024/0108527 | A1 * | 4/2024 | Davis | A61G 17/004 |

* cited by examiner

LIGHTWEIGHT CASKET LID HAVING ENHANCED BIODEGRADABILITY

This application claims the benefit of U.S. provisional patent application Ser. No. 63/348,334, filed Jun. 2, 2022, the disclosure of which is incorporated herein by reference in its entirety.

FIELD OF THE INVENTION

The present invention relates to caskets.

BACKGROUND OF THE INVENTION

Traditionally, ceremonial caskets have been designed to structurally withstand interment. To accomplish the foregoing, it is known to manufacture caskets from hardwoods and metal materials. However, in the case of green burials, the casket or other burial container is intended to decompose to a natural state.

Green burial is known as a method of interment having reduced environmental impact, and which aids in the conservation of natural resources and the reduction of carbon emissions, among other things. The Green Burial Council is an organization that provides standards and certifications for cemeteries and body-containing products towards these goals. One particular standard relates to the use of materials for burial containers that are biodegradable under burial conditions.

Natural cloth burial shrouds are often used in green burial, as they are readily degradable and lightweight. However, many people prefer some sort of structural casket for viewing ceremonies, and even graveside ceremonies. To address this, biodegradable caskets made of bamboo have been developed.

There is nevertheless a need, for a low cost biodegradable casket options.

SUMMARY OF THE INVENTION

The embodiments described herein address at least some of the above-stated needs, as well as others, by providing a lightweight casket formed primarily of corrugated paper, which uses natural, biodegradable materials.

A first embodiment is a casket arrangement that includes a container, a rigid strip, and a strap handle. The container has a bottom, first and second side walls, and first and second end walls forming open top box having a length and width configured to receive a deceased human body in supine position. The first and second side walls, first and second end walls and bottom are formed of biodegradable material. The rigid strip is operably coupled to the first side wall and disposed between an interior of the container and at least a portion of the first side wall. The strap handle has a first end portion, a second end portion, and an intermediate portion between the first end portion and the second end portion. The first and second end portions are affixed to the rigid strip. The intermediate portion extends from the first end portion through at least one opening in the first side wall, and extends from the second end portion through the at least one opening in the first side wall, such that the intermediate portion forms a flexible loop external to the container. The flexible loop is sized to receive a human hand for use as a handle.

A second embodiment is a casket arrangement having a container, at least one strap handle, and at least one cutout handle. The container has a bottom, first and second side walls, and first and second end walls forming open top box having a length and width configured to receive a deceased human body in supine position. The first and second side walls, first and second end walls and bottom are formed of biodegradable material. The strap handle has a first end portion, a second end portion, and an intermediate portion between the first end portion and the second end portion. The first and second end portions are operably coupled to the first side wall. The intermediate portion extends from the first end portion through at least one opening in the first side wall, and extends from the second end portion through the at least one opening in the first side wall. The intermediate portion forms a flexible loop external to the container, which is sized to receive a human hand for use as a handle. The cutout handle is formed by a cutout in the bottom, and includes a movable flap. The movable flap is movable to form an opening configured to receive multiple fingers of a human hand therethrough.

The above-described features and advantages, as well as others, will become more readily apparent to those of ordinary skill in the art by reference to the following detailed description and accompanying drawings.

DETAILED DESCRIPTION

Figure 1:
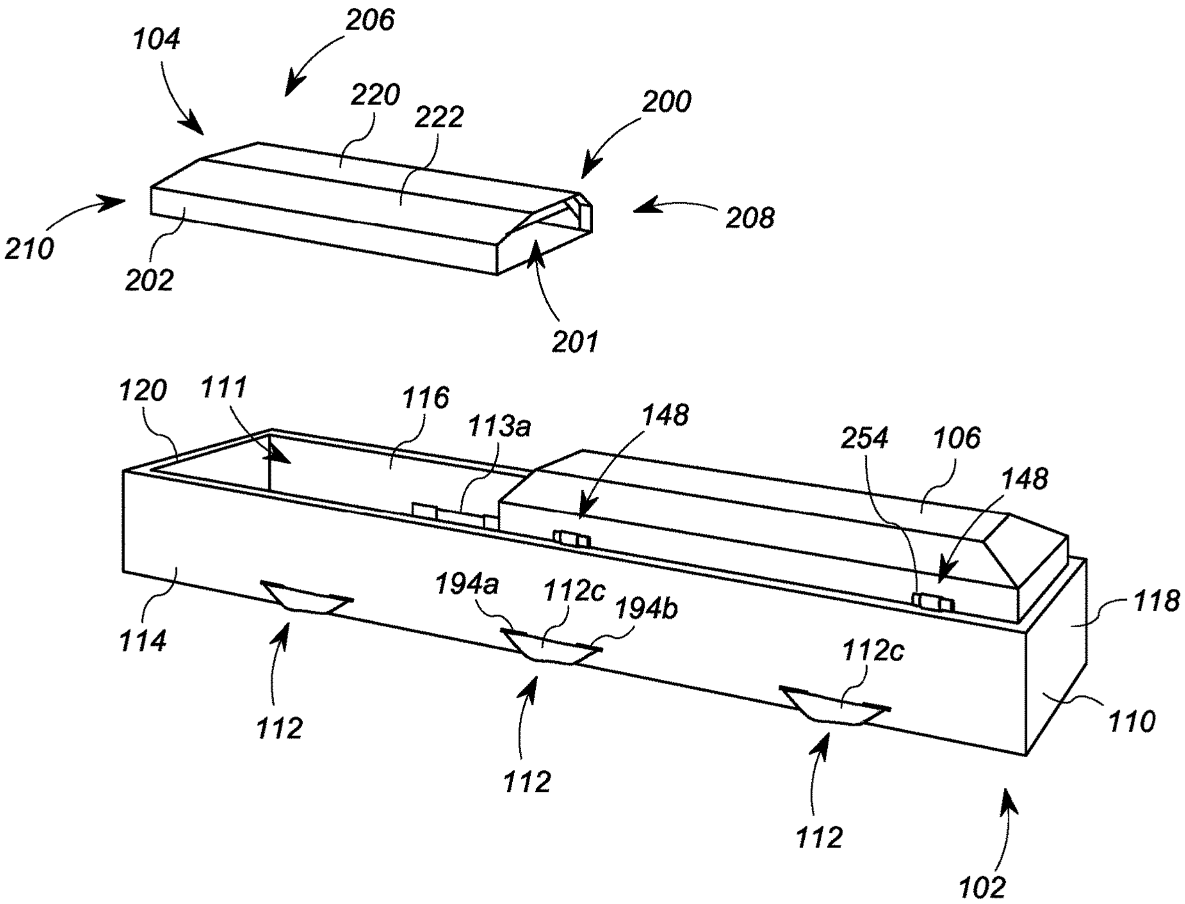
FIG. 1 shows a perspective view of an exemplary casket assembly that incorporates aspects of the disclosure.

FIG. 1 shows perspective views of an exemplary casket arrangement 100 according to a first embodiment. The casket arrangement 100 includes a casket body 102 and first and second lids 104 and 106, respectively. The casket arrangement 100 further includes interior features not shown in FIG. 1, but discussed below in connection with FIGS. 5 and 6. As shown in FIG. 1, the casket body 102 in this embodiment includes a container 110 having an interior 111, and a plurality of strap handles 112. The container 110 is formed of biodegradable material, which in this embodiment is corrugated fiberboard (i.e. corrugated cardboard or Kraft paper). In this embodiment, the casket body 102 further includes a rigid strip 113, and another rigid strip 113*a*, not shown in FIG. 1, which serve as anchors for the strap handles 112, as will be discussed in detail further below. In other embodiments, the container 110 may be formed of wood or wood-like products, such as lumber, particle board, medium density fiberboard, chipboard, and the like.

In general, the first lid 104 and the second lid 106 are configured to be mounted on the container 110 to cover the interior 111. However, in FIG. 1, the first lid 104 is removed to reveal a portion of the interior 111 of the container 110. It will be appreciated that the first lid 104 and the second lid 106 in this embodiment are essentially identical in construction. In some cases, the first lid 104 and second lid 106 can be essentially identical in construction except for their respective lengths, which may differ from each other as a matter of preference.

In this embodiment, each of the first lid 104 and the second lid 106 is configured to fit within the container 110 in an inverted position, or in other words, when upside down, compared to the orientation shown in FIG. 1. Thus, for shipment prior to use, for example, from a manufacturing or distribution facility, the lids 104, 106 fit entirely within the interior 111, thereby reducing the volume of the casket arrangement 100 for shipment and pre-use storage.

As shown in FIG. 1, each of the first lid 104 and the second is configured to mount to the container 110 such that they extend above the interior 111 of the container 110, and cover the contents of the container 110, and to provide vertical room for the body of the deceased that could exceed the height of the container 110. The second lid 106 is shown mounted to the container 110 in the non-inverted position in FIG. 1. In this embodiment, the first lid 104 and the second lid 106 are configured to cooperate to cover substantially the entire interior 111 when placed adjacent to each other and mounted to the container 110. Further detail regarding the first lid 104 and second lid 106 is provided below in connection with FIGS. 7, 8 and 9.

Figure 2:
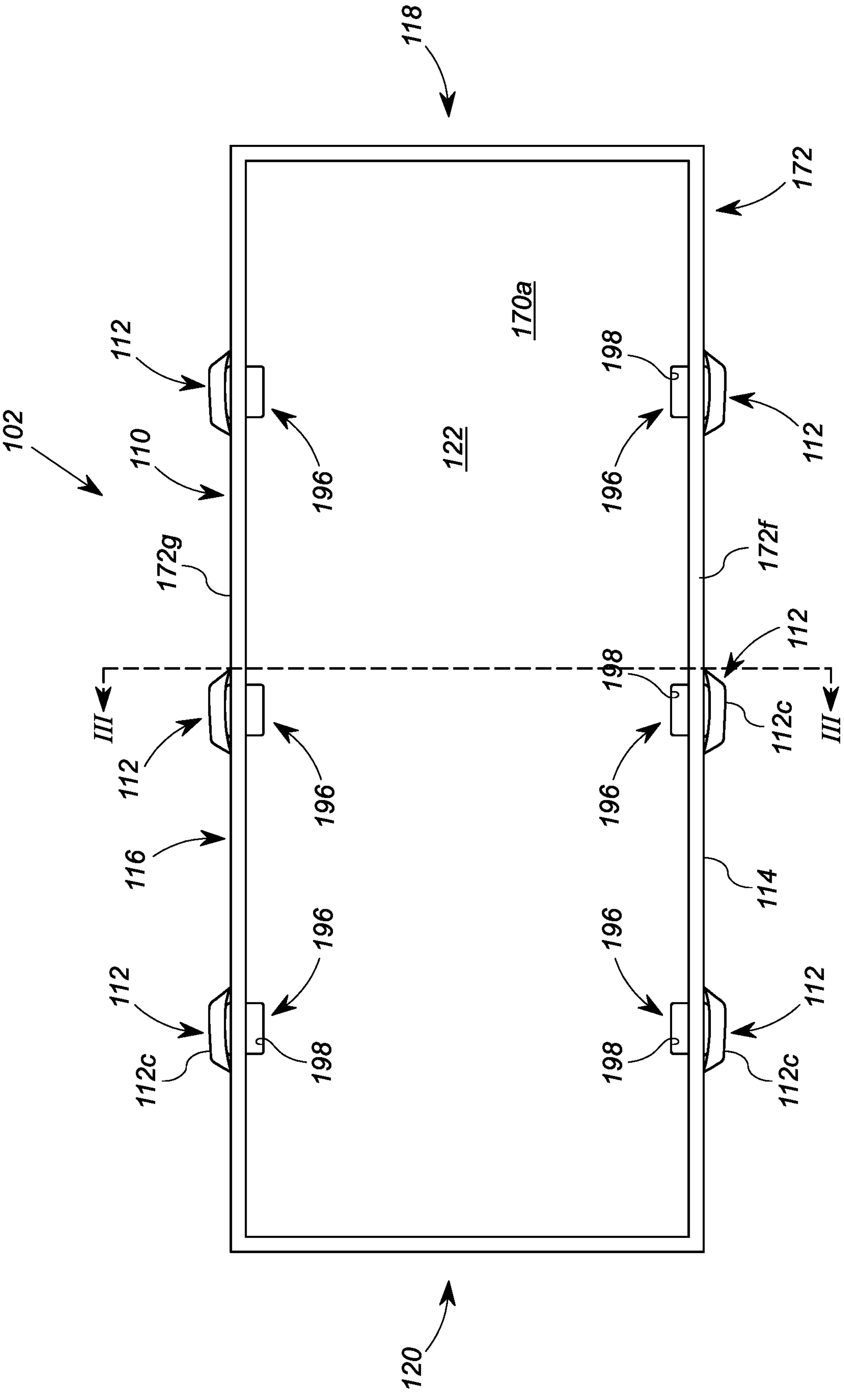
FIG. 2 shows a top plan view of a casket body of the casket assembly of FIG. 1.
Figure 3:
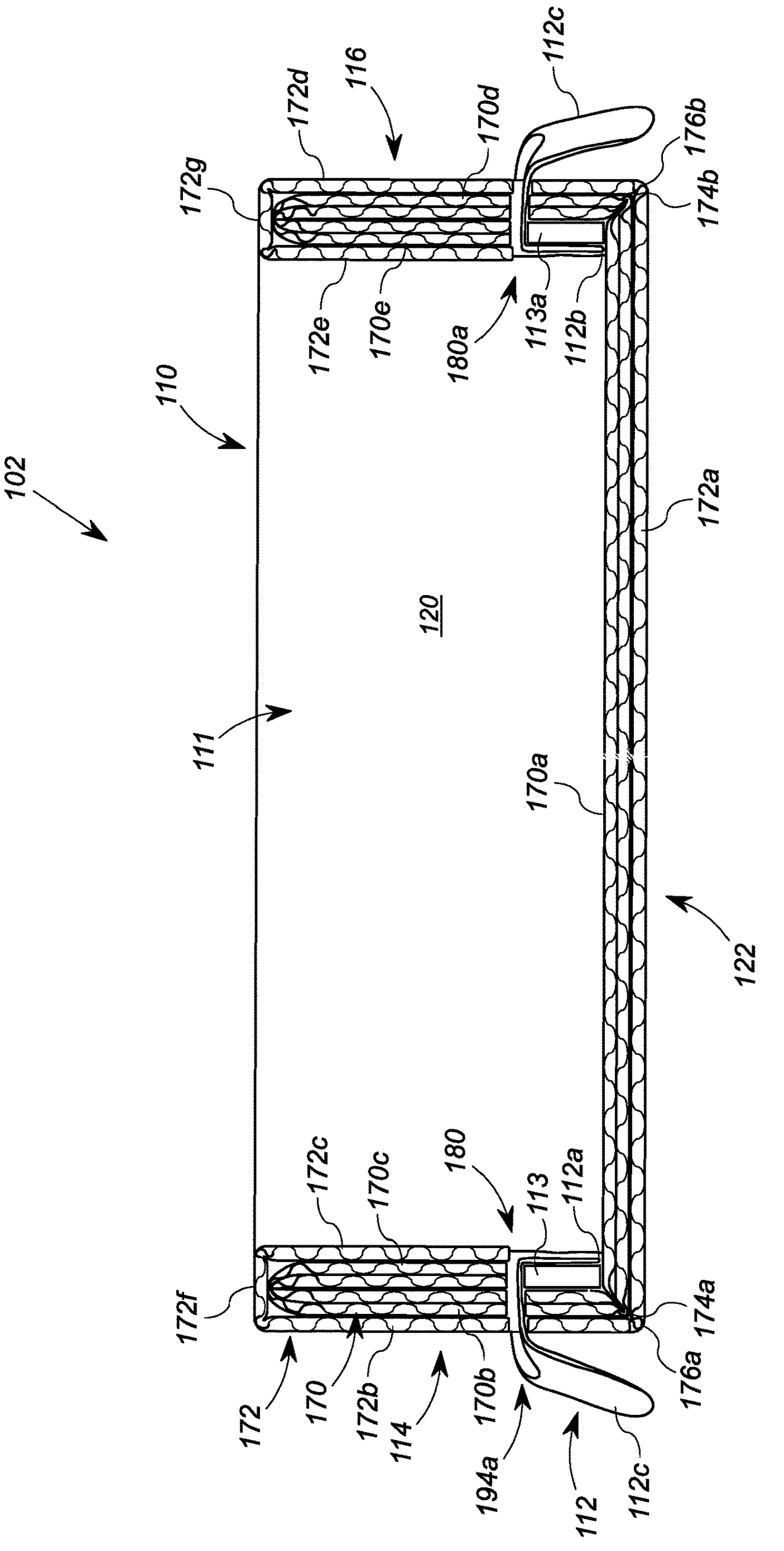
FIG. 3 shows a cutaway view of the casket body of FIG. 2.

FIG. 2 shows a top plan view of the casket body 102, and FIG. 3 shows a cross-section of the casket body 102 taken along lines III-III in FIG. 2. With reference to FIGS. 1, 2 and 3, the container 110 includes a first side wall 114, a second opposite side wall 116, a first end wall 118, a second opposite end wall 120, and a bottom 122, not visible in FIG. 1. The bottom 122 is a wall, panel or set of panels that generally defines the bottom of container 110. The first side wall 114 and the second side wall 116 have elongated sides compared to the end walls 118, 120, such that the side walls 114, 116 and end walls 118, 120 define, respectively the sides and ends of a substantially rectangular open top box. The bottom 122 extends between and intersects with both side walls 114 and end walls 116 to form the open-topped box structure of the container 110.

Further detail regarding the structure of the container 110 is provided in connection with FIG. 3. FIG. 3 shows a cutaway view of the casket body 102 taken along line III-III in FIG. 2. With reference to FIGS. 2 and 3, the walls 114, 116, 118 and 120 and bottom 122 are formed from two folded sheets 170, 172 of corrugated fiberboard. The first folded sheet 170 is a double ply sheet that includes a bottom panel 170*a*, a first upward side panel section 170*b*, a first downward side panel section 170*c*, a second upward side panel section 170*d*, and a second downward side panel section 170*e*. The first folded sheet 170 has similar end panel sections, not shown, but which may take any suitable form. It will be noted that the first folded sheet 170 typically will include connecting extensions on either the side panel sections 170*b*, 170*c*, 170*d*, 170*e* and/or end panel sections that are used to connect the side panel sections 170*b*, 170*c*, 170*d*, and/or 170*e* to the end panel sections.

The bottom panel 170*a* forms at least a portion of the bottom 122 and has substantially the same length and width dimensions. Thus, the bottom panel 170*a* in this embodiment is rectangular in shape and has a length and width substantially equal to the length and width of the casket body 102.

The first upward side panel section 170*b* is foldably connected to a first long edge 174*a* of the bottom panel 170*a* and extends upward to form a portion of the first side wall 114, and extends the length of the first side wall 114. The first downward section 170*c* is foldably connected to the first upward side panel section 170*b* and extends downward along the first upward side panel 170*b* to form another portion of the first side wall 114. The first downward section 170*c* extends downward to the top surface of the bottom panel 170*a* and/or to the top of a recess 180 in the first side panel 114, which will be discussed below in detail.

The second upward side panel section 170*d* is foldably connected to the opposite long edge 174*b* of the bottom panel 170*a* and extends upward to form a portion of the second side wall 116, and extends the length of the second side wall 116. The second downward section 170*e* is foldably connected to the second upward side panel section 170*d* and extends downward along the second upward side panel 170*d* to form another portion of the second side wall 116. The second downward section 170*e* extends downward to the top surface of the bottom panel 170*a* and/or to the top of another recess 180*a* in the first side panel 116, which will be discussed below in detail.

The second folded sheet 172 is a single ply sheet that wraps around the exterior of at least a portion of first fold sheet 170. To this end, the second folded sheet 172 includes a bottom panel 172*a*, a first upward side panel section 172*b*, a first downward side panel section 172*c*, a second upward side panel section 172*d*, and a second downward side panel section 172*e*. The second folded sheet 172 also includes a first top section 172*f* and a second top section 172*g*. The second folded sheet 172 has similar end panel sections, not shown, but which may take any suitable form. It will be noted that the second folded sheet 172 typically will include connecting extensions on either the side panel sections 172*b*, 172*c*, 172*d*, 172*e* and/or end panel sections that are used to connect the side panel sections 172*b*, 172*c*, 172*d*, and/or 172*e* to the end panel sections.

Because the second folded sheet 172 forms an outer layer, it may be desirable to print decorative or other indicia thereon. The use of a thinner, in this case single-ply, outer layer helps facilitate the printing process. The folded sheet 172 is printed with indicia when it is an unfolded flat blank. It will be appreciated, however, that various features and advantages of the embodiments described herein may be obtained with containers formed with different layers, fewer layers, more layers of corrugated fiberboards, or even formed with different materials constructed differently. In one example, the first folded sheet 170 may be replaced by a wood container structure of similar dimensions, and/or a container structure made of other materials or a combination of materials, and further include the second folded sheet 172 as a wrap.

Referring again to the FIGS. 2 and 3, the bottom panel 172*a* forms the outer portion of the bottom 122 and has substantially the same length and width dimensions. Thus, the bottom panel 170*a* of the first folded sheet 170 sits directly or indirectly on the bottom panel 172*a* of the second folded sheet 172.

The first upward side panel section 172*b* is foldably connected to a first long edge 176*a* of the bottom panel 172*a* and extends upward along the first upward side panel section 170*b* of the first folded sheet 170 to form the outer portion of the first side wall 114, and extends the length of the first side wall 114. The first top section 172*f* is foldably connected to, and extends between, each of the first upward side panel section 172*b* and the first downward section 172*c*. The first downward section 172*c* extends downward along the first downward side panel 170*c* of the first folded sheet 170 to form the inner exposed surface of the first side wall 114. The first downward section 172*c* extends downward to the top surface of the bottom panel 170*a* and/or to the top of the recess 180 in the first side panel 114.

Similarly, the second upward side panel section 172*d* is foldably connected to a second long edge 176*b* of the bottom panel 172*a* and extends upward along the second upward side panel section 170*d* of the first folded sheet 170 to form the outer portion of the second side wall 116, and extends the length of the second side wall 116. The second top section 172*g* is foldably connected to, and extends between, each of the second upward side panel section 172*d* and the second downward section 172*e*. The second downward section 172*e* extends downward along the second downward side panel section 170*e* of the first folded sheet 170 to form the inner exposed surface of the second side wall 116. The second downward section 172*e* extends downward to the top surface of the bottom panel 170*a* and/or to the top of the recess 180*a* in the second side panel 116.

Figure 4:
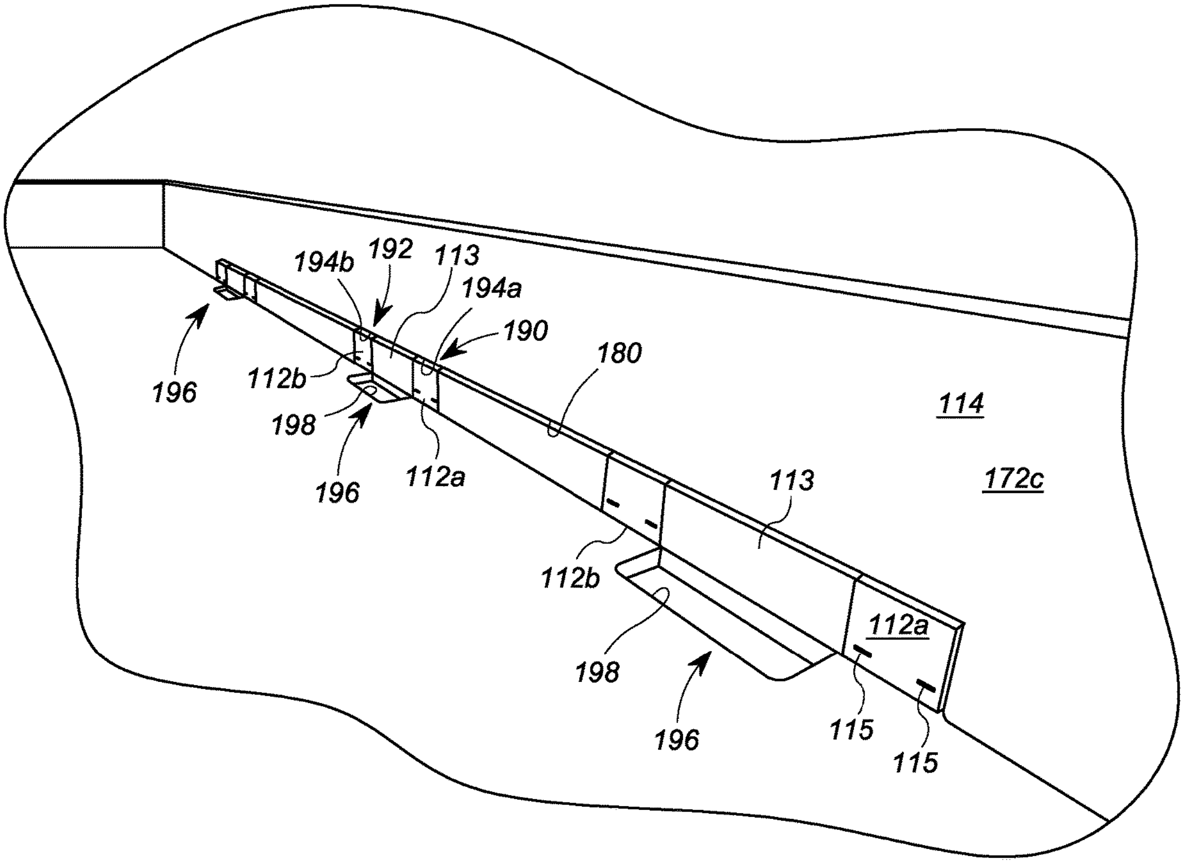
FIG. 4 shows a fragmentary perspective interior view of the casket body of FIG. 2.

The handle arrangement for the casket body 102 is described with reference to FIGS. 1, 2, 3 and 4. FIG. 4 shows a fragmentary perspective view of the casket body 102 showing a portion of the interior 111 of the casket body. In general, the handle arrangement includes the plurality of strap handles 112 operably connected to one of the set of rigid strips or handle anchors 113, 113*a*. The strap handles 112 are formed of fabric that is preferably biodegradable, such as a woven cotton strap. However, other materials, including non-biodegradable materials, could be used. Each handle anchor 113, 113*a* in this embodiment is a 1.5" by 7⁄16" wooden block, but may be a strip or length of other material that has a rigidity or hardness that exceeds that of the materials of the side walls 114, 116.

The first rigid strip 113 is operably coupled to the first side wall 114 such that it is disposed between the interior 111 and at least a portion of the first side wall 114. The rigid strip 113 is secured in position using adhesive or other suitable fastener, and in this embodiment has a length that spans the distance of three strap handles 112 that are spaced apart on the side wall 114. Similarly, the rigid strip 113*a* is operably coupled to the second side wall 116 such that it is disposed between the interior 111 and at least a portion of the second side wall 116. It will be appreciated that in other embodiments, individual handle anchors may be provided for each strap handle 112. However, in this embodiment, the length of the rigid anchors 113, 113*a* can also provide a degree of structural reinforcement to the side walls 114, 116.

As discussed above, the rigid strip 114 is disposed such that it is between the interior 111 and at least a part of the side wall 114. To this end, the rigid strip 113 in this embodiment is disposed in the recess 180 formed in the first side wall 114. (See FIGS. 3 and 4). The recess 180 is defined by the reduced length of the downward extension of the first downward section 172*c* of the second folded sheet 172, and optionally a similar reduction of the downward extension of the first downward section 170*c* of the first folded sheet 170. (See FIG. 3). Similarly, the rigid strip 113*a* is disposed in the recess 180*a* formed in the second side wall 116. (See FIGS. 3 and 4). The recess 180*a* is likewise defined by a reduction in the downward extension of the second downward section 172*e* of the second folded sheet 172, and optionally a reduction of the downward extension of the second downward section 170*e* of the first folded sheet 170. (See FIG. 3). It will be appreciated that in other embodiments, the rigid strips 113, 113*a* may simply be attached to the interior surface of the side walls 114, 116.

As discussed above, a plurality of strap handles 112 are affixed to each of the first and second rigid strips or handle anchors 113, 113*a*. With specific reference to FIG. 4, the strap handles 112 are secured to respective rigid strips 113, 113 via staples or other fasteners 115. More specifically, each strap handle 112 is a length of flexible material having a first end portion 112*a*, a second end portion 112*b*, and an intermediate portion 112*c* disposed between the first end portion 112*a* and the second end portion 112*b*. Referring to an exemplary strip 113, the first end portion 112*a* of each strip 113 is affixed to the rigid strip 113 at a first location 190, and the second end portion 112*b* is affixed to the rigid strip 113 at a second location 192. (See also FIG. 2). The intermediate portion 112*c* extends from the first end portion 112*a* through a first opening 194*a* in the first side wall 114 and extends from the second end portion 112*b* through a second opening 194*b* in the first side wall 114. As a result, the intermediate portion 112*c* forms a flexible loop external to the container 110, anchored by the connections of the end portions 112*a*, 112*b* to the strip 113. (See also FIG. 1). The flexible loop is sized to receive a human hand for use as a handle.

In this embodiment, the first opening 194*a* is adjacent to the first location 190 and adjacent a top edge of the strip 113. Similarly, the second opening 194*b* is adjacent to the second location 192 and adjacent the top edge of the strip 113. The other strap handles 112 are coupled to one or the other of the strips 113, 113*a* in the same manner. It will be appreciated that the openings 194*a*, 194*b* may be replaced by a single opening in other embodiments.

In some cases, users desire a different handle than the strap handles 112. This may be due, for example, to different methods of carrying caskets according to the culture of the deceased's family, for example, to a gravesite. In some cases it is desirable for funeral professionals move the casket without using the strap handles 112 so as to preserve the strap handles 112 in an unused, pristine state for use by the pallbearers. Accordingly, in at least some embodiments, the casket body 102 includes an alternative handle arrangement.

With reference to FIGS. 2 and 4, the bottom 122 has a plurality of cutout handles 196 formed by cutouts 198 in the bottom 122. The cutouts 198 form a four-sided opening that is configured to receive multiple fingers of a human hand, to act as a handle. Multiple cutouts 198 are spaced apart on the bottom 122 adjacent to the first side wall 114 and multiple cutouts 198 are spaced apart on the bottom 122 adjacent to the second side wall 116. The cutouts 198 may be laterally aligned with the locations of the strap handles 112. For example, one of the cutouts 198 as shown in FIG. 4 is disposed vertically adjacent to, and laterally between, the first location 190 and the second location 192. It will be appreciated that, as with the strap handles 112, one or more cutout handles 196 can be placed on either or both of the end walls 118, 120, if desired.

In this embodiment, all material of the cutout 198 in the first folded sheet 170 are completely removed. However, in the second folded sheet 172, one of the four sides is not cut, so that the cutout forms a movable flap 199, not visible in FIG. 4, but see FIG. 6. The movable flap 199 is movable to provide an opening configured to receive multiple fingers of a human hand therethrough.

Figure 5:
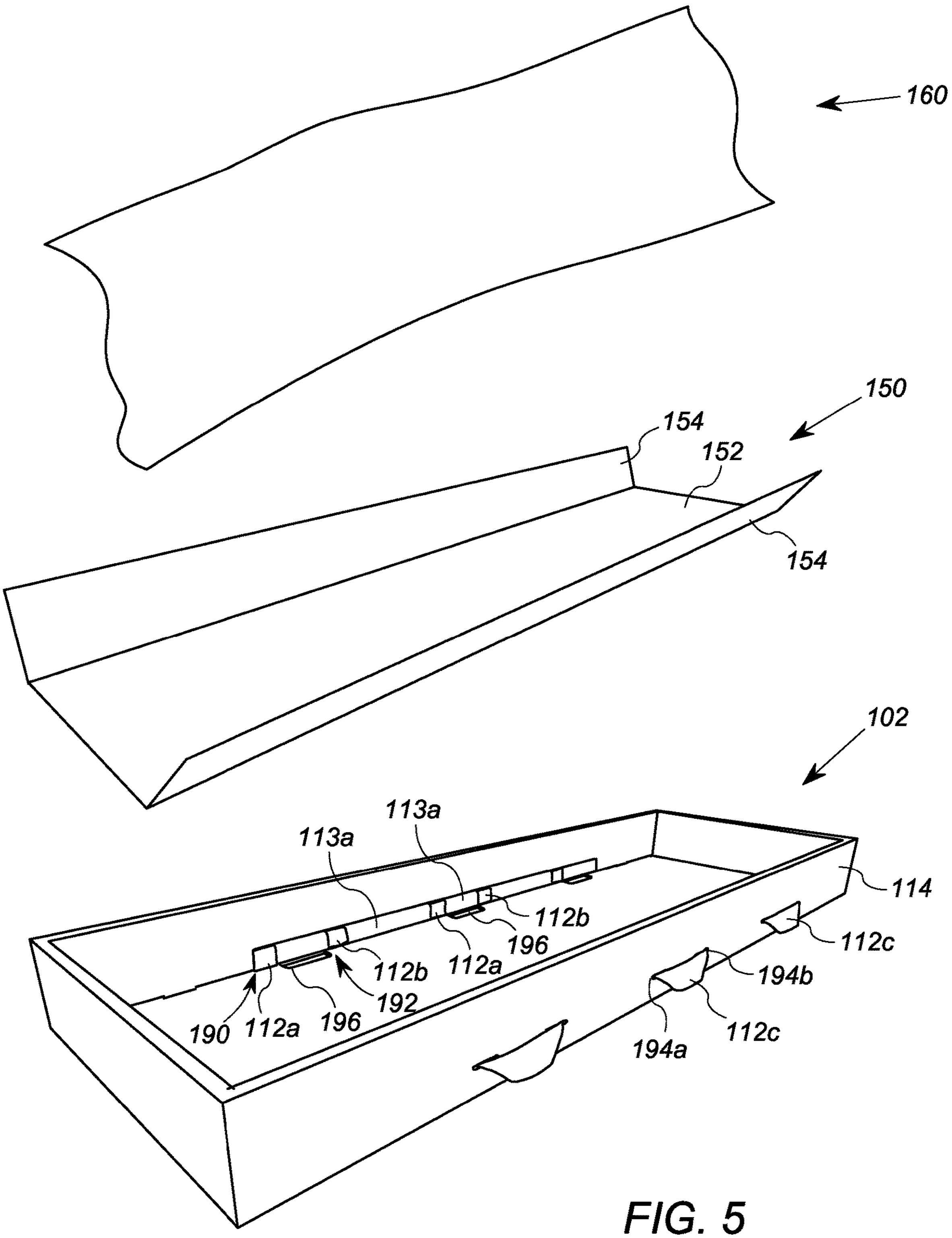
FIG. 5 shows an exploded plan view of the casket body of FIG. 2 with an optional bed and optional sheet or liner.
Figure 6:
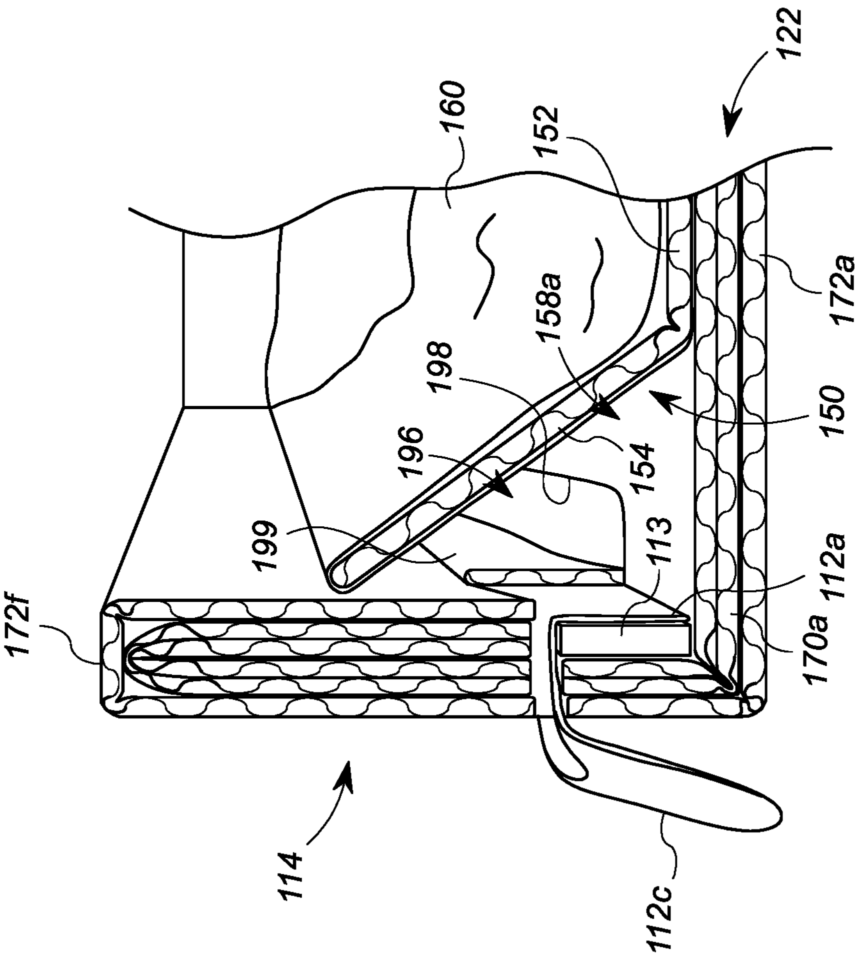
FIG. 6 shows a fragmentary cutaway perspective view of the body, bed, and sheet or liner of FIG. 5 assembled for use.

One drawback of the bottom cutout handles 196 is that a user or pallbearer may come into contact with the deceased, either directly or through clothing, bed sheet and/or flexible liner, which is undesirable. To address this issue, the present embodiment includes a more rigid barrier structure (more rigid than cloth or a flexible liner sheet) that separates the space in which the fingers may extend through the cutout handles 196 and the body of the deceased. FIGS. 5 and 6 illustrate interior components of the casket arrangement 100 in this embodiment that, among other things, provide this barrier. These interior components include a bed 150, and a flexible sheet 160.

More specifically, FIG. 5 shows an exploded view of the casket body 102, the bed 150, and the flexible cloth sheet 160. FIG. 6 shows a fragmentary, cutaway, perspective view of the casket body 102, the bed 150 and the cloth 160 in an assembled state ready for use. With reference to FIGS. 5 and 6, the bed 150 includes a bottom panel 152 and side panels 154 attached thereto. The bottom panel 152 is disposed directly or indirectly on the bottom 122 of the container 110. The two bed side panels 154 extend in an inclined manner from the bottom panel 152 to respective ones of the first and second side walls 114, 116 of the container 110 when the bottom panel 152 is disposed on the bottom 122 of the container 110. As such, the bed side panels 154 form a barrier between the space 158*a* wherein the hands extending through the cutout handles 196 can reach, and the portion 111*a* of the interior 111 above the bed 150 where the deceased, not shown, is disposed.

The flexible sheet 160 is extends around and covers the top side of the bed bottom panel 152 and bed side panels 154 so that little or no corrugated fiberboard of the bed 150 is exposed to viewers of the deceased. The flexible sheet 160 may be a cloth bed sheet, waterproof liner, or other flexible material provided for functional and/or aesthetic purposes.

It will be appreciated that the bed 150 may be formed from a corrugated fiberboard sheet, not show, which has a flat width greater than the width of the container 110. As such, the side panels 154 fit into the interior 111 by folding upward to the inclined position shown in FIG. 6, thereby creating the barrier.

It will be appreciated that the term "bed" as used herein is not limited to traditional sleeping beds, but rather meant to further include structures configured to fit within the interior 111 directly or indirectly on the bottom of the container 110, and to be disposed between the deceased and the bottom 122.

Referring again generally to FIGS. 1 and 3, the first side wall 114, the second side wall 116, the first end wall 118, the second opposite end wall 120, and the bottom panel, are sized and configured to reasonably fit or contain a human body in supine position. It will be appreciated that the height of the walls 114, 116, 118 and 120 define a casket body top level such that a portion of a deceased may extend above the casket body top level (i.e. above the level of the top ledges of the side walls 114, 116 and end walls 118, 120. The reduced height reduces shipping costs, and allows for better viewing of the face of the deceased during funereal events. Accordingly, the lids 104, 106 are constructed to be mountable on the casket body 102 such that they extend above the top level of the casket body 102, in order to provide room thereunder for any portion of the deceased that extends above the casket body top level.

In addition, the lids 104, 106 have a smaller horizontal footprint than the container 110, and can be inverted and placed within the container 110 for shipment, such that the entire structure of the lid 104, 106 is at or below the top level of the casket body 102. This reduces risk of shipping damage to lid, reduces cost, and reduces space needed for storage. When the stored body 110 and lids 104, 106 are ready for use to contain a deceased, the lids 104, 106 are removed from within the container 110. During use, the lids 104, 106 are supported at least in part above the top level 130. In one embodiment, the lids 104, 106 are supported by clips, such as those shown in U.S. Patent publication no. US Publication No. 2023/0079701 A1, which is incorporated herein by reference.

In this embodiment, however, the lids 104, 106 are supported on the container 110 by a series of mounting tethers 148, which can be made of biodegradable material. In general, the mounting tethers 148 are coupled to the lids 104, 106, and include a strap 252 and a dowel 254, which cooperate to prevent the lids 104, 106 from falling into the interior 111, thereby supporting the lids 104, 106 in the position shown in FIGS. 1 and 2.

Figure 7:
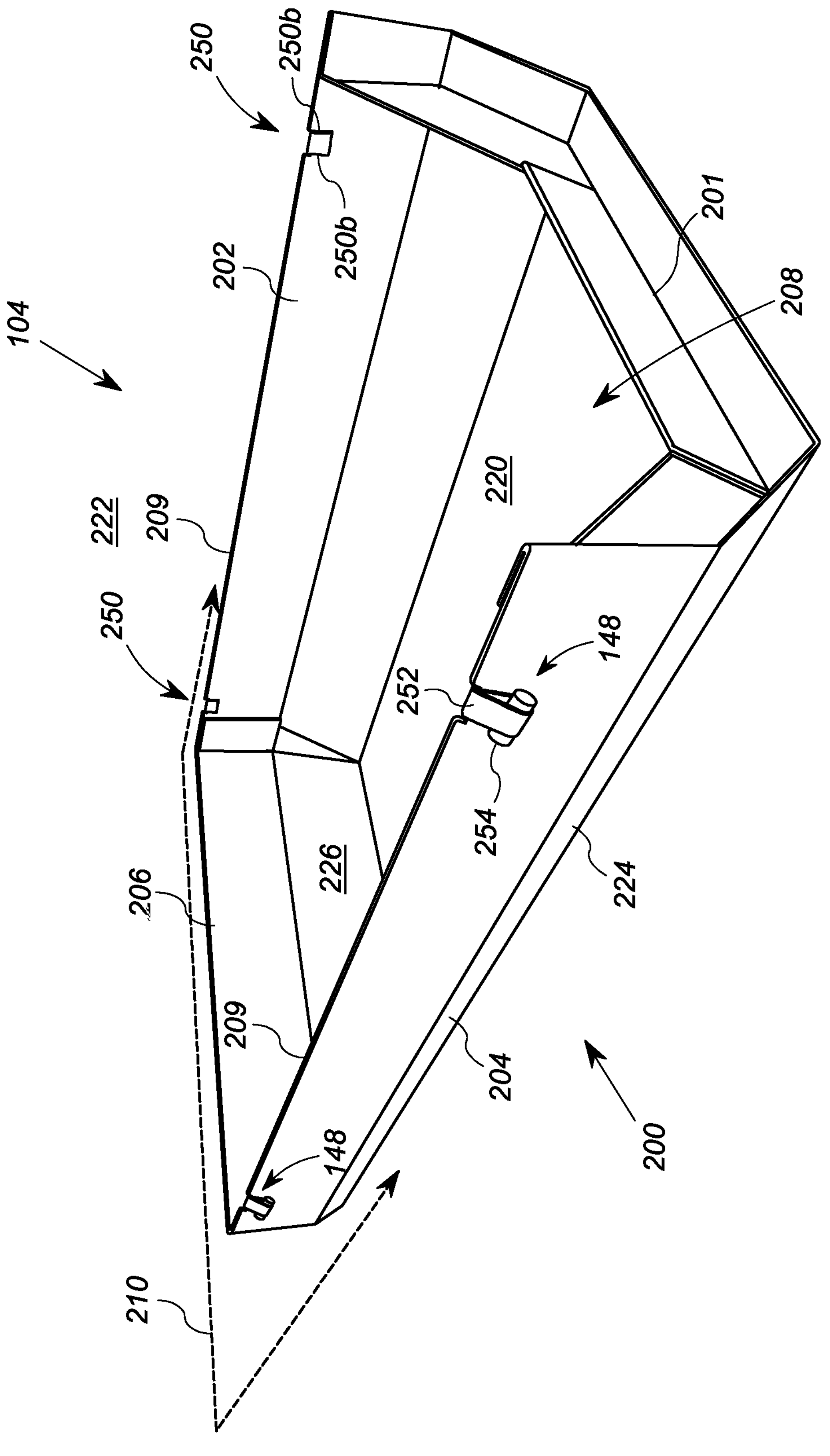
FIG. 7 shows a bottom perspective view of a lid of the casket assembly of FIG. 1.

In general, the lids 104, 106 may be formed of any suitable material, and preferably biodegradable material. In this embodiment, each of the first and second lids 104, 106 embodiment is formed primarily from corrugated fiberboard or Kraft paper. Each of the first and second lids 104, 106 is formed from a folded corrugated blank, not shown. In further detail, FIG. 7 shows a perspective view of the underside of the first lid 104.

It will be appreciated that unless otherwise stated, references to directional terms, including but not limited to, vertical, horizontal, upward, downward, top, and bottom, are made with respect to the condition that the first lid 104 and second lid 106 are disposed on the casket in closed position.

As discussed above, the first lid 104 is configured to extend partially over the interior of the container 110, similar to the second lid 106 as shown in FIG. 1. The second lid 106 complementarily extends over the rest of the interior of the casket body as shown in FIG. 1. With specific reference to FIGS. 1 and 7, the first lid 104 includes a lid body 200 and a bridge 201. The bridge 201 is intended to be disposed in or near the center of the container 110 when in the closed position.

The lid body 200 includes a first side 202, a second side 204, a first end 206 and an open end 208. The first side 202 is a panel or wall configured to extend along a portion of the first side wall 114 of the container 110 when the first lid 104 is assembled onto the container 110 in closed position (FIG. 2). The second side 204 is likewise a panel or wall of the lid body 200 configured to extend along a portion of the second side wall 116 in closed position. The first end 206 is a panel or wall configured to extend along the second end wall 120 in closed position, and the open end 208 is sized to extend over an intermediate portion of the container 110 disposed between the first end 118 and the second end 120 in the closed position.

As will be discussed below in further details, the bottom edges 209 of at least two of the first side 202, second side 204, and first end 206 define a lid body bottom plane 210. Although the bottom edges 209 of the first side 202, second side 204, and the first end 206 all lie in the lid body bottom plane 210 in this embodiment, it will be appreciated that the bottom edges 209 at least two of the first side 202, second side 204, and first end 206 can define the lid body bottom plane 210 even if the bottom edges in other embodiments have discontinuities such that portions of the bottom edges do not lie in the plane 210.

In this embodiment, the lid body 200 further includes a top panel 220, a first inclined panel 222, a second inclined panel 224, and a third or end inclined panel 226. Each of the first side 202, the second side 204, and the first end 206 extend vertically, and the top panel 220 extends horizontally.

As shown in FIG. 7, the side 202 includes at least two tether flaps 250 formed as foldable cutouts of the edge 209.

The side 204 has identical flaps, which are not visible in FIG. 7. Each tether flap 250 has two sides **250*b* cut in from the edge 209 of the side 202/204 and a fold connection 650*a* to the side 202/204. A mounting tether 148 is secured to each tether flap 250**.

Specifically, the mounting tether 148 includes a length of strap 252 wrapped around and secured to the dowel 254. The strap 252 is preferably a biodegradable material such as cotton fiber, but could be made of nylon in some embodiments. The dowel 254 may suitably be made of wood, a rolled paper tube, a second of bamboo or other natural material, or recycled material. The two ends **252*a* of the tether 252 are stacked away from the dowel 254 and are stapled or otherwise connected to the flap 250 on the outer surface of the respective side 202, 204**.

Figure 8:
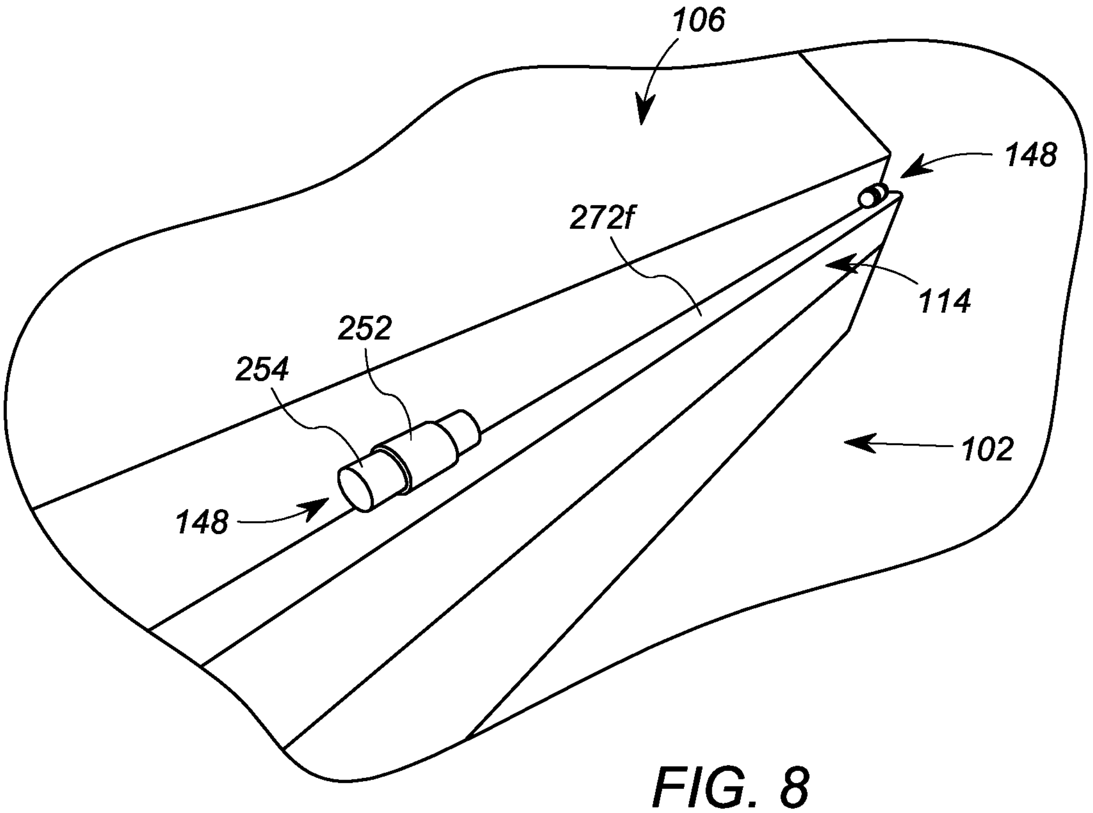
FIG. 8 shows a fragmentary perspective view of the casket assembly of FIG. 1.

In use for containing a deceased, as shown in FIG. 1, the lid 106 is placed onto the casket body 102 such that the dowels 254 are trapped in the corner between the lid walls 202, 204 and the top of the respective casket side walls 114, 116. FIG. 8 shows a fragmentary perspective view of the lid 106 placed on the casket body 102 with the tethers 148 in position to retain the lid 106 on the side wall 114. In the position shown in FIGS. 1 and 8, the straps 252 and trapped dowels 254 limits the downward travel of the lid 106, thereby preventing the lid 106 (or 104) from falling further downward into the casket body 102. However, the lower plane 210 of the lid 106 is disposed slightly below the top level of the casket body 102.

Figure 9:
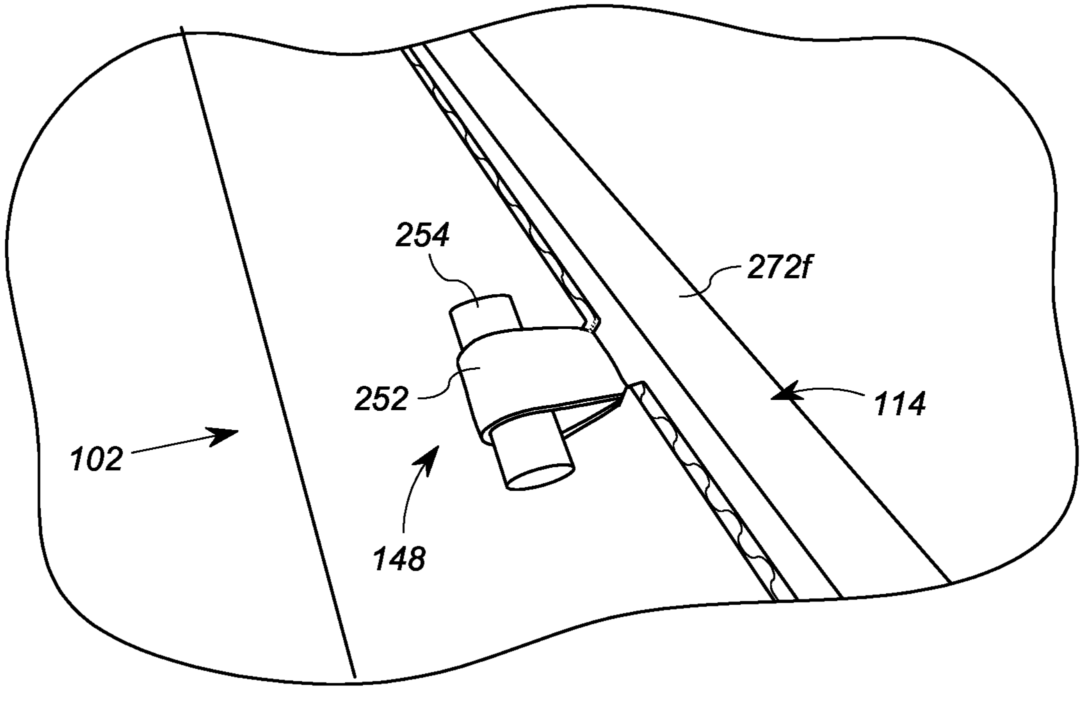
FIG. 9 shows a fragmentary perspective view of the casket assembly of FIG. 1, wherein the casket lid is disposed within the casket body for shipment and/or storage.

The mounting tether can also be used in the shipping mode of the casket assembly 100. As discussed above, the lids 104, 106 are sized to fit within the container 110 in an inverted or upside-down position. The mounting tethers 148 can be used to facilitate removal of the lids 104, 106. More specifically, FIG. 9 illustrates a fragmentary perspective view of the lid 106 inverted and placed inside the casket body 102 for shipment. It can be seen that the flap 250 allows the strap 252 clearance to fall inward to ensure that the dowel 254 does not extend above the top of the side wall 114 during shipment. Furthermore, the user may pull on the dowels 254 to remove the lid from the container 110.

It will be appreciated that the above-described embodiments are merely exemplary, and that those of ordinary skill in the art may readily devise their own modifications and implementations the incorporate the principles of the present invention and fall within the spirit and scope thereof.

The invention claimed is:

1. A casket arrangement, comprising:

a container having a bottom, first and second side walls, and first and second end walls forming an open top box having a length and width configured to receive a deceased human body in supine position, wherein the first and second side walls, first and second end walls and bottom are formed of biodegradable material;

a rigid strip operably coupled to the first side wall and disposed between an interior of the container and at least a portion of the first side wall, the rigid strip having a hardness that is greater than a hardness of the first side wall; and a strap handle having a first end portion, a second end portion, and an intermediate portion between the first end portion and the second end portion, the first end portion affixed to a first section of the rigid strip, the second end portion affixed to the first section of the rigid strip, and the intermediate portion extending from the first end portion through at least one opening in the first side wall, and extending from the second end portion through the at least one opening in the first side wall, such that the intermediate portion forms a flexible loop external to the container, the flexible loop sized to receive a human hand for use as a handle;

a second strap handle having a first end portion, a second end portion, and an intermediate portion between the first end portion and the second end portion, the first end portion and second end portion of the second strap handle affixed to a second section of the rigid strip, and the intermediate portion of the second strap handle extending from the first end portion of the second strap handle through at least one further opening in the first side wall, and extending from the second end portion of the second strap handle through the at least one further opening in the first side wall, such that the intermediate portion of the second strap handle forms a second flexible loop external to the container spaced apart from the flexible loop, the second flexible loop sized for use as a handle;

wherein the rigid strip includes an intermediate section extending from and integrally formed with the first section and the second section, and wherein at least the first section, the second section, and the intermediate section cooperate to provide strengthening reinforcement to the first side wall.

2. The casket arrangement of claim 1, wherein:

the at least one opening comprises a first opening and a second opening spaced apart from the first opening;

the intermediate portion extends from the first end portion through the first opening; and the intermediate portion extends from the second end portion through the second opening.

3. The casket arrangement of claim 2, wherein the first end portion is affixed to the rigid strip at a first location, and the second end portion affixed to the rigid strip at a second location that is spaced apart from the first location.

4. The casket arrangement of claim 1, wherein the strap handle is formed of a biodegradable material.

5. The casket arrangement of claim 1, further comprising:

a second rigid strip operably coupled to the second side wall and disposed between the interior of the container and at least a portion of the second side wall;

a further strap handle having a first end portion, a second end portion, and an intermediate portion between the first end portion and the second end portion, the first end portion of the further strap handle and the second end portion of the further strap handle affixed to the second rigid strip, and the intermediate portion of the further strap handle extending from the first end portion of the further strap handle through at least one opening in the second side wall, and extending from the second end portion of the further strap handle through the at least one opening in the second side wall, such that the intermediate portion of the further strap handle forms a further flexible loop external to the container, the further flexible loop sized to receive a human hand for use as a handle.

6. The casket arrangement of claim 1, further comprising at least a first lid covering the interior of the container.

7. The casket arrangement of claim 6, wherein the first lid includes a lid body configured to fit within the container in an inverted position, and configured to mount to the container such that the lid body extends above the container in a non-inverted position.

8. A casket arrangement, comprising:

a container having a bottom, first and second side walls, and first and second end walls forming an open top box having a length and width configured to receive a deceased human body in supine position, wherein the first and second side walls, first and second end walls and bottom are formed of biodegradable material;

a rigid strip operably coupled to the first side wall and disposed between an interior of the container and at least a portion of the first side wall, the rigid strip having a hardness that is greater than a hardness of the first side wall;

a strap handle having a first end portion, a second end portion, and an intermediate portion between the first end portion and the second end portion, the first end portion affixed to the rigid strip, the second end portion affixed to the rigid strip, and the intermediate portion extending from the first end portion through at least one opening in the first side wall, and extending from the second end portion through the at least one opening in the first side wall, such that the intermediate portion forms a flexible loop external to the container, the flexible loop sized to receive a human hand for use as a handle;

a first lid covering the interior of the container, the first lid including a lid body configured to fit within the container in an inverted position, and configured to mount to the container such that the lid body extends above the container in a non-inverted position; and wherein the first lid further comprises at least a first mounting tether configured to retain the first lid on the container in the non-inverted position.

9. The casket arrangement of claim 8, further comprising:

a second strap handle having a first end portion, a second end portion, and an intermediate portion between the first end portion and the second end portion, the first end portion and second end portion of the second strap handle affixed to the rigid strip, and the intermediate portion of the second strap handle extending from the first end portion of the second strap handle through at least one further opening in the first side wall, and extending from the second end portion of the second strap handle through the at least one further opening in the first side wall, such that the intermediate portion of the second strap handle forms a second flexible loop external to the container spaced apart from the flexible loop, the second flexible loop sized for use as a handle.

10. The casket arrangement of claim 9, wherein:

the first end portion of the first strap handle is affixed to the rigid strip at a first location;

the second end portion of the first strap handle is affixed to the rigid strip at a second location that is spaced apart from the first location;

the first end portion of the second strap handle is affixed to the rigid strip at a third location, and the second end portion of the second strap handle is affixed to the rigid strip at a fourth location that is spaced apart from the first location, the second location and the third location.

11. The casket arrangement of claim 8, wherein the first lid is formed of corrugated paper and the tether is formed from biodegradable materials.

12. A casket arrangement, comprising:

a container having a bottom, first and second side walls, and first and second end walls forming an open top box having a length and width configured to receive a deceased human body in supine position, wherein the first and second side walls, first and second end walls and bottom are formed of biodegradable material;

a strap handle having a first end portion, a second end portion, and an intermediate portion between the first end portion and the second end portion, the first end portion operably coupled to the first side wall, the second end portion operably coupled to the first side wall, and the intermediate portion extending from the first end portion through at least one opening in the first side wall, and extending from the second end portion through the at least one opening in the first side wall, such that the intermediate portion forms a flexible loop external to the container, the flexible loop sized to receive a human hand for use as a handle;

a cutout handle formed by a cutout in the bottom, the cutout forming a movable flap, the movable flap movable to form an opening configured to receive multiple fingers of a human hand therethrough.

13. The casket arrangement of claim 12, further comprising a bed having side panels configured to provide a barrier between the cutout handle and a portion of the interior of the container when the bed is disposed within the container.

14. The casket arrangement of claim 13, wherein:

the bed includes a corrugated fiberboard bottom panel;

the side panels are formed of corrugated fiberboard and are foldably attached to the bottom panel; and the two bed side panels extend in an inclined manner from the bottom panel to respective ones of the first and second side walls of the container when the bottom panel is disposed on the bottom of the container.

15. The casket arrangement of claim 14, wherein:

the at least one opening comprises a first opening and a second opening spaced apart from the first opening;

the intermediate portion extends from the first end portion through the first opening; and the intermediate portion extends from the second end portion through the second opening.

16. The casket arrangement of claim 15, further comprising a rigid handle anchor operably coupled to the first side wall and disposed between an interior of the container and at least a portion of the first side wall, and wherein:

the first end portion of the strap handle is affixed to the rigid handle anchor, and the second end portion is affixed to the rigid handle anchor.

17. The casket arrangement of claim 12, wherein:

the at least one opening comprises a first opening and a second opening spaced apart from the first opening;

the intermediate portion extends from the first end portion through the first opening; and the intermediate portion extends from the second end portion through the second opening.

18. The casket arrangement of claim 17, further comprising a rigid strip operably coupled to the first side wall and disposed between an interior of the container and at least a portion of the first side wall, and wherein:

the first end portion of the strap handle is affixed to the rigid strip, and the second end portion is affixed to the rigid strip.

19. The casket arrangement of claim 18, further comprising at least a first lid covering the interior of the container, the first lid including a lid body configured to fit within the container in an inverted position, the first lid configured to mount to the container such that the lid body extends above open top box in an non-inverted position.

20. The casket arrangement of claim 19, wherein the first lid further comprises at least a first mounting tether configured to retain the first lid on the container in the non-inverted position.

* * * * *